US011470100B1

(12) United States Patent
Christian (10) Patent No.: US 11,470,100 B1
(45) Date of Patent: Oct. 11, 2022

(54) DATA SURVEILLANCE IN A ZERO-TRUST NETWORK

(71) Applicant: Flying Cloud Technologies, Inc., Polson, MT (US)

(72) Inventor: Brian P. Christian, Sioux Falls, SD (US)

(73) Assignee: Flying Cloud Technologies, Inc., Polson, MT (US)

( * ) Notice: Subject to any disclaimer, the term of this patent is extended or adjusted under 35 U.S.C. 154(b) by 0 days.

(21) Appl. No.: 17/699,550

(22) Filed: Mar. 21, 2022

(51) Int. Cl.
*H04L 9/40* (2022.01)

(52) U.S. Cl.
CPC ........ *H04L 63/1416* (2013.01); *H04L 63/104* (2013.01); *H04L 63/1425* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 7,065,657 B1 | 6/2006 | Moran | |
| 7,114,002 B1 | 9/2006 | Okumura et al. | |
| 7,260,846 B2 | 8/2007 | Day | |
| 8,161,550 B2 | 4/2012 | Keen et al. | |
| 8,213,313 B1 | 7/2012 | Doiron et al. | |
| 8,276,202 B1 | 9/2012 | Dubrovsky et al. | |
| 8,448,234 B2 | 5/2013 | Mondaeev et al. | |
| 8,762,298 B1 | 6/2014 | Ranjan et al. | |
| 8,782,790 B1 | 7/2014 | Smith et al. | |
| 8,793,790 B2 | 7/2014 | Khurana et al. | |
| 8,997,227 B1 | 3/2015 | Mahtre et al. | |
| 9,060,014 B2 | 6/2015 | Crowley | |
| 9,083,740 B1 | 7/2015 | Ma et al. | |
| 9,094,288 B1 | 7/2015 | Nucci et al. | |
| 9,106,687 B1 | 8/2015 | Sawhney et al. | |

(Continued)

FOREIGN PATENT DOCUMENTS

WO 2014-138115 A1 9/2014

OTHER PUBLICATIONS

Aruba "ClearPass Policy Manager", https://www.arubanetworks.com, Mar. 1, 2017, pp. 1-890, Aruba Networks, A Hewlett Packward Company, Sunnyvale, CA, USA—Part 1.

(Continued)

*Primary Examiner* — Joseph P Hirl
*Assistant Examiner* — Hassan Saadoun
(74) *Attorney, Agent, or Firm* — Asif Ghias (57) ABSTRACT

Data surveillance techniques are presented for the detection of security and/or performance issues on a zero-trust computer network. There is a network device policy manager that works in conjunction with a network data policy manager and which is in charge of performing the above data surveillance. Of special interest are those security issues where privileged data may be stolen by steganographic, data manipulation or any form of exfiltration attempts. Such attempts may be made by rogue users or admins from the inside of a network, or from outside hackers who are able to intrude into the network but can impersonate themselves as legitimate users. The above data surveillance techniques are also applied for detecting intentional or unintentional exfiltration/leak of privileged data/assets between unauthorized users/groups of the organization.

20 Claims, 4 Drawing Sheets

(56) References Cited

U.S. PATENT DOCUMENTS

| | | | |
|---|---|---|---|
| 9,430,646 B1* | 8/2016 | Mushtaq | H04L 67/02 |
| 10,142,785 B2 | 11/2018 | Wootton et al. | |
| 10,542,026 B2 | 1/2020 | Christian | |
| 10,542,027 B2 | 1/2020 | Wittenschlaeger | |
| 10,594,714 B2 | 3/2020 | Crabtree et al. | |
| 2005/0210533 A1 | 9/2005 | Copeland et al. | |
| 2007/0220588 A1 | 9/2007 | Panda et al. | |
| 2010/0153316 A1 | 6/2010 | Duffield et al. | |
| 2012/0233222 A1 | 9/2012 | Roesch | |
| 2014/0165201 A1 | 6/2014 | Wittenschlaeger | |
| 2015/0082456 A1 | 3/2015 | Eren et al. | |
| 2015/0096024 A1 | 4/2015 | Haq et al. | |
| 2015/0163121 A1 | 6/2015 | Mahaffey et al. | |
| 2015/0205962 A1 | 7/2015 | Swidowski et al. | |
| 2016/0014154 A1 | 1/2016 | Huang et al. | |
| 2016/0294704 A1 | 10/2016 | Fan et al. | |
| 2016/0295422 A1 | 10/2016 | Fan et al. | |
| 2016/0301707 A1* | 10/2016 | Cheng | H04L 67/12 |
| 2016/0373409 A1 | 12/2016 | Zhu et al. | |
| 2017/0054751 A1* | 2/2017 | Schneider | H04L 63/1441 |
| 2017/0099196 A1 | 4/2017 | Barsheshet et al. | |
| 2017/0171234 A1 | 6/2017 | Christian | |
| 2017/0302665 A1 | 10/2017 | Zou et al. | |
| 2018/0375888 A1* | 12/2018 | Christian | H04L 63/0245 |
| 2019/0098033 A1* | 3/2019 | Christian | G06N 20/00 |
| 2020/0106797 A1* | 4/2020 | Christian | H04L 63/1483 |
| 2020/0204574 A1 | 6/2020 | Christian | |
| 2020/0252800 A1* | 8/2020 | Grutzmacher | H04W 24/02 |
| 2020/0336508 A1* | 10/2020 | Srivastava | H04L 63/20 |
| 2021/0360016 A1* | 11/2021 | Kaushal | H04L 67/535 |

OTHER PUBLICATIONS

Aruba "ClearPass Policy Manager", https://www.arubanetworks.com, Mar. 1, 2017, pp. 1-890, Aruba Networks, A Hewlett Packward Company, Sunnyvale, CA, USA—Part 2.

Atefi et al., A Hybrid Intrusion Detection System based on Different Machine Learning Algorithms, Proceedings of the 4th International Conference on Computing and Informatics, Paper No. 022, Aug. 2013, pp. 312-320.

Bhaskar et al., A Hybrid Model for Network Security Systems Integrating Intrusion Detection System with Survivability, International Journal of Network Security, vol. 7, No. 2, Sep. 2008, pp. 249-260.

C-DAC Bangalore Electronics City, Analysis of Network Packets, presentation, pp. 1-39, CDAC, Bangalore, India.

Chan et al., Machine Learning for Computer Security, Journal of Machine Learning Research 7, 2006, pp. 2669-2672.

Demertzis et al., A Hybrid Network Anomaly and Intrusion Detection Approach Based on Evolving Spiking Neural Network Classification, CCIS 441, 2014, pp. 11-23, DOI: 10.1007/978-3-319-11710-2_2.

Devi K. J et al, Hybrid Intrusion Detection with Weighted Signature Generation, International Journal of Computer Applications in Engineering Sciences vol. 1, Issue IV, Dec. 2011, pp. 450-453, ISSN: 2231-4946.

ExtraHop, Universal Payload Analysis, Fact Sheet, pp. 1, ExtraHop, Seattle, WA, USA.

FireEye, AX Series Forensic Analysis Platforms that Provide a Full 360-degree View of a Cyber Attack, Fact Sheet, 2014, pp. 1-3, FireEye Inc., Milpitas, CA, USA.

FLIR, "FLIR Screen-EST Skin Temperature Screening Software", http://www.flir.com, Sep. 17, 2020, pp. 1-2, FLIR Systems Inc., Wilsonville, OR, USA.

Garcia-Teodoro et al., Network-based Hybrid Intrusion Detection and Honeysystems as Active Reaction Schemes, IJCSNS International Journal of Computer Science and Network Security, vol. 7 No. 10, Oct. 2007, pp. 62-70.

Hashim, The Integration of SNORT with K-Means Clustering Algorithm to Detect New Attack, presentation, Fakultat fur Informatik Technische, 2011, pp. 1-14, Munich, Germany.

Hijazi, Network Traffic Characterization Using (p, n)-grams Packet Representation, Thesis for Doctor of Philosophy, Carleton University, 2014, Ontario, Canada.

Hwang et al., Hybrid Intrusion Detection with Weighted Signature Generation over Anomalous Internet Episodes, IEEE Transactions on Dependable and Secure Computing, vol. 4, No. 1, Jan.-Mar. 2007, pp. 1-15.

Icetana, "Milestone Certified Solution", http://www.milestonesys.com, Sep. 17, 2020, pp. 1-13, Milestone Systems A/S, Brondby, Denmark.

Intel, A Well-Connected Sandbox, Solution Brief, pp. 1-5, 2015, McAfee, Part of Intel Security, Santa Clara, CA, USA.

Jawhar et al., Design Network Intrusion Detection System using hybrid Fuzzy-Neural Network, International Journal of Computer Science and Security, vol. 4: Issue (3), 2010, pp. 285-294.

Jeyanna et al., A Network Intrusion Detection System Using Clustering and Outlier Detection, International Journal of Innovative Research in Computer and Communication Engineering, vol. 3, Issue 2, Feb. 2015, pp. 975-982, ISSN Online): 2320-9801, ISSN (Print): 2320-9798.

Juvonen et al., Combining Conjunctive Rule Extraction with Diffusion Maps for Network Intrusion Detection, authors' postprint version of the article. The original print version appeared in The Eighteenth IEEE Symposium on Computers and Communications (ISCC 2013). IEEE 2013. Available online at http://ieeexplore.ieee.org/stamp/stamp.jsp?o=&arnumber=6754981&isnumber=6754912.

Kizza, Guide to Computer Network Security, Chapter 13: System Intrusion Detection and Prevention, 2009.

Kornblum, Jesse, "Identifying Almost Identical Files Using Context Triggered Piecewise Hashing", The Digital Forensic Research Conference (DFRWS), Aug. 14-16, 2006, Science Direct, Elsevier, 8 pgs.

Madbouly et al., Relevant Feature Selection Model Using Data Mining for Intrusion Detection System, International Journal of Engineering Trends and Technology (IJETT)—vol. 9 No. 10—Mar. 2014, pp. 501-512, ISSN:2231-5381.

McCaffrey, Data Clustering—Detecting Abnormal Data Using k-Means Clustering, Microsoft Developer Network (MSDN) Magazine, Feb. 2013, pp. 1-17.

Mrdovic, Network packet payload analysis for intrusion detection, University of Sarajevo, 2006, pp. 1-6, Sarajevo, Bosnia.

Munz et al., Signature Detection in Sampled Packets, publication of Wilhelm Schickard Institute for Computer Science, University of Tuebingen, 2007, pp. 1-6, Tuebingen, Germany.

Munz et al., Traffic Anomaly Detection Using K-Means Clustering, publication of Wilhelm Schickard Institute for Computer Science, University of Tuebingen, 2007, pp. 1-8, Tuebingen, Germany.

Omar et al., Machine Learning Techniques for Anomaly Detection: An Overview, International Journal of Computer Applications (0975-8887) vol. 79—No. 2, Oct. 2013, pp. 33-41.

Payload Security, VxStream Sandbox—Automated Malware Analysis System, Fact Sheet, 2015, Germany.

Perona et al, Service-independent payload analysis to improve intrusion detection in network traffic, Australian Computer Society, Inc., Seventh Australasian Data Mining Conference AusDM 2008, Glenelg, Australia.

Prathibha KS et al, Analysis of Hybrid Intrusion Detection System Based on Data Mining Techniques, International Journal of Engineering Trends and Technology (IJETT)—vol. 15 No. 9—Sep. 2014, pp. 448-452, ISSN: 2231-5381.

Rashida, Hybrid Architecture for Distributed Intrusion Detection System in Wireless Networks, International Journal of Network Security & Its Applications (IJNSA), vol. 5, No. 3, May 2013, pp. 45-54, DOI: 10.5121/ijnsa.2013.5305.

Sedjelmaci et al., Novel Hybrid Intrusion Detection system for Clustered Wireless Sensor Network, International Journal of Network Security & Its Applications (IJNSA), vol. 3, No. 4, Jul. 2011, pp. 1-14.

Seyyedi et al, High Payload and Secure Steganography method Based on Block Partitioning and Integer Wavelet Transform, International Journal of Security and Its Applications vol. 8, No. 4, 2014, pp. 183-194 http://dx.doi.org/10.14257/ijsia.2014.8.4.17.

(56) References Cited

OTHER PUBLICATIONS

Shanmugam et al., Hybrid Intrusion Detection Systems (HIDS) using Fuzzy Logic, Intrusion Detection Systems, Dr. Pawel Skrobanek (Ed.), ISBN: 978-953-307-167-1, InTech, Available from: http://www.intechopen.com/books/intrusion-detection-systems/hybrid-intrusion-detection-systems-hids-using-fuzzy-logic, 2011, pp. 136-154, Kuala Lumpur, Malaysia.

Shon et al, A hybrid machine learning approach to network anomaly detection, Information Sciences 177, 2007, pp. 3799-3821, doi:10.1016/j.ins.2007.03.025.

Smutz, Network Payload Analysis for Advanced Persistent Threats, presentation, Lockheed Martin GIRT, 2010, pp. 1-36.

Stiawan et al, Characterizing Network Intrusion Prevention System, International Journal of Computer Applications (0975-8887) vol. 14—No. 1, Jan. 2011, pp. 11-18.

Summers, Packet Analysis Reference Guide v3.0, CISSP—ISSAP, ISSMP, CISA, 4001 Rec, 2008, pp. 1-46.

Tesfahun et al., Effective Hybrid Intrusion Detection System: A Layered Approach, I. J. of Computer Network and Information Security, Feb. 2015, pp. 35-41, DOI: 10.5815/ijcnis.2015.03.05.

Wang et al, Network Anomaly Detection: A Survey and Comparative Analysis of Stochastic and Deterministic Methods, Boston University research publication, 2013, pp. 1-7, Boston, MA, USA.

Wang, Network Payload-based Anomaly Detection and Content-based Alert Correlation, Submitted in partial fulfillment of the requirements for the degree of Doctor of Philosophy in the Graduate School of Arts and Sciences, Columbia University, 2006.

Zanero, Analyzing TCP Traffic Patterns Using Self Organizing Maps, publication, D.E.I.—Politecnico di Milano, via Ponzio 34/5—20133, 2005, pp. 1-8, Milan, Italy.

Zhang et al, Improvments of Payload-based Intrusion Detection Models by Using Noise Against Fuzzy SVM, Journal of Networks, vol. 6, No. 2, Feb. 2011, pp. 330-340.

\* cited by examiner

DATA SURVEILLANCE IN A ZERO-TRUST NETWORK

RELATED APPLICATIONS

This application is related to U.S. patent application Ser. No. 16/700,554 filed on Dec. 2, 2019 and now U.S. Pat. No. 10,848,514 B2 issued on Nov. 24, 2020 and which is incorporated by reference in its entirety for all purposes.

FIELD OF THE INVENTION

This invention relates to the field of data monitoring, data surveillance and information technology (IT) security in a zero-trust environment.

BACKGROUND ART

Information security is an active field of academic and industrial pursuit. With the news of data breaches by hackers, and data theft or exfiltration by rogue insiders a commonplace occurrence, it is unsurprising to see many academic and professional institutions focusing their efforts to develop tools and practices for securing their computing and network environments. These efforts are largely aimed at making computing networks and infrastructure more secure against exploitative attacks from global hackers as well as from accidental or intentional data theft attempts from the inside.

There are many ways of detecting security attacks on an IT infrastructure in the prior art. U.S. Pat. No. 9,094,288 to Nucci discloses a method for profiling network traffic including obtaining a signature library with multiple signatures. Each signature represents a data characteristic associated with a corresponding application executing in the network. Then based on a predetermined criterion, a group behavioral model associated with the signature library is generated. The group behavioral model represents a common behavior of multiple historical flows identified from the network traffic. The signatures correlate to a subset of the plurality of historical flows. Then a flow in the network traffic is selected for inclusion in a target flow set, where the flow matches the group behavioral model. This match is without correlation to any corresponding application of the signatures. The target flow set is analyzed to generate a new signature which is then added to the signature library.

U.S. Pat. No. 8,448,234 to Mondaeev teaches a method of determining whether a data stream includes unauthorized data. The data stream is analyzed using a hardware filter to detect the presence of one or more set of patterns in the data stream. It is determined whether a packet in the data stream belongs to one of the data flows to be further inspected based on the analysis of the data stream by the hardware filter. A set of rules is applied to the packet to produce a rule match if it is determined that the packet belongs to one of the data flows to be further inspected. The packet is analyzed to determine if the packet includes unauthorized data using software if the rule match indicates that the packet potentially includes unauthorized data.

U.S. Patent Publication No. 2012/0233222 to Roesch teaches a system that includes a sensor and a processor. The sensor is configured to passively read data in packets as the packets are in motion on the network. The processor operating with the sensor is configured to read the data from the sensor and to originate real-time map profiles of files and file data. The processor then performs correlation and inference from the read data from the sensor.

U.S. Patent Publication No. 2015/0163121 to Mahaffey discloses a system where data is collected from a set of devices. The data is then associated with the devices, mobile application programs (apps), web applications, users, or a combination of these. Then a norm is established using the collected data. The norm is then compared with the data collected from a specific device. If there is a deviation outside of a threshold deviation between the norm and the data collected from the particular device, a response is initiated.

U.S. Patent Publication No. 2006/0085854 A1 to Agrawal et al. teaches a method of detecting an intrusion into (or an anomaly in a behavior of) a target software system. The method begins by instrumenting the target software system to generate behavior data representing a current observation or observation aggregate. The method then determines whether the current observation or observation aggregate warrants a second level examination; preferably, this determination is made by processing the current observation or observation aggregate through a first level detection algorithm that provides a first, provisional indication of a possible intrusion. If a result of executing the first level detection algorithm indicates that the current observation or observation aggregate warrants a second level examination, the method continues by processing the current observation or observation aggregate through at least one or more second level detection algorithms to provide a second, more definite, fine grain indication of a possible intrusion.

The above observation aggregates used by the first and second level detection algorithms may be the same or different. The first and second level detection algorithms may be executed in the same or different systems, machines or processors. The target software system operation may be suspended as the current observation or observation aggregate is processed through the one or more second level detection algorithms. A given action (e.g., sending an alert, logging the event, activating a countermeasure, or the like) may be taken if the result of the second level examination indicates a possible intrusion. Multiple algorithms may be executed together within a single examination level, with the individual results then analyzed to obtain a composite result or output indicative of intrusive or anomalous behavior.

U.S. Patent Publication No. 2018/0365593 A1 to Galitsky discloses systems, devices, and methods of determining a document classification as to whether it is public or private. For example, a document classification application generates a set of discourse trees, each discourse tree corresponding to a sentence of a document and including a rhetorical relationship that relates two elementary discourse units. The document classification application creates one or more communicative discourse trees from the discourse trees by matching each elementary discourse unit in a discourse tree that has a verb to a verb signature. The document classification application combines the first communicative discourse tree and the second communicative discourse tree into a parse thicket and applies a classification model to the parse thicket in order to determine whether the document is public or private.

U.S. Patent Publication No. 2013/0232263 A1 to Kelly et al. concerns systems and methods for classifying at least one contagious phenomenon propagating on a network. Classifying may be based on one or more of a peaked-ness, a commitment, a commitment by subsequent uses, a commitment by time range, and a dispersion related to engagement with the contagious phenomenon.

U.S. Patent No. 8,726,382 B2 to Knapp et al. describes methods for tracking attacking nodes that include extracting, from a database, an instance of each unique packet header associated with IP-to-IP packets transmitted over a time period. The method includes determining from extracted headers, which nodes have attempted to establish a connection with an excessive number of other nodes over a period, identifying these as potential attacking nodes. It further includes determining from the headers, which other nodes responded with a TCP SYN/ACK packet, indicating a willingness to establish connections, and a potential for compromise. Nodes scanned by potential attacking nodes are disqualified from the identified nodes based on at least one of two criteria. These are, data in the headers relating to at least one of an amount of data transferred, and scanning activities conducted by the nodes that responded to a potential attacking node with a TCP SYN/ACK packet. Any remaining potential attacking nodes and scanned nodes are presented to a user.

U.S. Patent Publication No. 2018/0048668 A1 to Gupta et al. teaches approaches for modeling a risk of security breaches to a network. Agents gather, from multiple sources across the network, analysis data that identifies observed characteristics of habitable nodes and opaque nodes. Using the analysis of data, a multi-layer risk model for the network is generated that comprises a first layer that models an inherent risk of security breaches to assets of the network based on the observed characteristics. The model also comprises a second layer that models a present state of the inherent risk to the assets caused by global and temporal events. The model also comprises a third layer that models a change to the risk of security breaches in response to potential mitigative actions. The model may be used to understand how risk of a security breach is distributed and interdependent upon the nodes of the network so as to allow the most valuable preventive measures to be taken.

U.S. Patent Publication No. 2018/0091539 A1 to Marquardt et al. describes network security analysis system that performs anomaly detection with low false positives by implementing a multiple perspective analysis of network data. The analysis system implements natural language processing techniques to examine the content of network and time series data to identify anomalies within new activity.

U.S. Patent Publication No. 2018/0375886 A1 to Kirti et al. describes in various implementations, a security management and control system for monitoring and management of security for cloud services. These can include automated techniques for identifying the privileged users of a given cloud service. In various examples, the security management and control system can obtain activity logs from the cloud service where the activity logs record actions performed by users of an organization in using the cloud service. In various examples, the security management and control system can identify actions in the activity logs that are privileged with respect to the cloud service. In these and other examples, the security management and control system can use the actions in the activity log to identify privileged users. Once the privileged users are identified, the security management and control system can monitor the privileged users with a higher degree of scrutiny.

Research publication entitled, "Hybrid Machine Learning Technique For Intrusion Detection System" by Tahir et al. appearing in the Proceedings of the 5th International Conference on Computing and Informatics, ICOCI 2015, argues that the utilization of the Internet has grown tremendously resulting in more critical data being transmitted and handled online. Hence, the number of attacks on important information over the internet is increasing yearly. The paper argues that intrusion is one of the main threats to the internet. Various techniques and approaches have been developed to address the limitations of intrusion detection system such as low accuracy, high false alarm rate, and time consuming.

Their research proposes a hybrid machine learning technique for network intrusion detection based on a combination of K-means clustering and support vector machine classification. The aim of this research is to reduce the rate of false positive alarms, false negative alarms and to improve the detection rate. The classification has been performed by using support vector machines. After training and testing the proposed hybrid machine learning technique, the results have shown that the proposed technique has achieved a positive detection rate and reduced the false alarm rate.

Research article entitled, "A Hybrid Model for Network Security Systems: Integrating Intrusion Detection System with Survivability" by Bhaskar et al., dated September 2008 proposes a holistic approach to network security with a hybrid model that includes an Intrusion Detection System (IDS) to detect network attacks and a survivability model to assess the impacts of undetected attacks. A neural network-based IDS is proposed, where the learning mechanism for the neural network is evolved using genetic algorithm. Then the case where an attack evades the IDS and takes the system into a compromised state is discussed. A stochastic model is then proposed, which allows one to perform a cost/benefit analysis for systems security. This integrated approach allows systems managers to make more informed decisions regarding both intrusion detection and system protection.

Reference article entitled, "Network packet payload analysis for intrusion detection" by Mrdovic dated 2006, explores the possibility of detecting intrusions into computer networks using network packet payload analysis. Various issues with IDS are explained in the paper. An integrated approach to IDS building is suggested. Anomaly detection process improvements are recommended. Prevailing methods for network intrusion detection based on packet metadata, headers, are also compared with the approach proposed in the paper. Reasoning behind packed payload analysis for intrusion detection is also presented. Modeling of HTTP normal and anomalous payload using artificial neural networks is suggested as the best approach in the paper.

A shortcoming of the prior art teachings is that they do not conform to the requirements of a zero-trust computer network. There is no presumption of trust in such a zero-trust architecture and the prevailing techniques fail to detect security and/or performance issues in such an environment. There is further no teaching of data surveillance that utilizes a network data policy manager that works in conjunction with a network device policy manager of a zero-trust computer network. As a result, most of the security and/or performance issues go undetected in a zero-trust environment based on the techniques of the prior art. These include IP threats, data leaks/exfiltration attempts, insider threats, etc.

OBJECTS OF THE INVENTION

In view of the shortcomings and unfulfilled needs of the prior art, it is an object of the present invention to provide a set of techniques for identifying security issues and/or performance issues in a zero-trust computer network.

It is also an object of the invention to detect security issues related to Data Loss Prevention (DLP) and data exfiltration from privileged data assets and sensitive data sources.

It is also an object of the invention to provide for a hybrid data surveillance system employing both supervised and unsupervised machine learning techniques.

It is also an object of the system to apply Deep Packet Inspection (DPI) and subsequent analysis to analyze each and every packet of the data being surveilled, and not just a sampled subset.

It is also an object of the invention to provide for an early detection of data leak/exfiltration incidents where a privileged asset may have been inadvertently shared between unauthorized users of an organization.

It is also an object of the invention to provide for above early detection with the knowledge/analysis of a centroid drift in accordance with the normal activities of the organization.

It is also an object of the invention to attach contextual information to security/performance events/incidents while applying above techniques.

It is also an object of the invention to provide for an implementation of the above techniques in a "community capture" manner.

These as well as other objects of the invention will be evident in the forthcoming summary and detailed description sections of this disclosure.

SUMMARY OF THE INVENTION

The objects and advantages of the invention are secured by a system and methods of a data surveillance system operating in a zero-trust computer network. The data surveillance system identifies security and/or performance issues on the zero-trust computer network. According to the chief aspects, there is a network data policy manager that is loosely, or alternatively, tightly integrated with a network device policy manager. The network device policy manager is in charge of controlling access to various devices on the zero-trust network.

On the other hand, the instant network data policy manager is responsible for monitoring or surveilling access to various data sources and computer systems with privileged data on the zero-trust computer network. For this purpose, one or both of network device policy manager and network data policy manager interact with a permissions datastore/repository in order to access/inherit permissions/privileges of various users and groups on the network to the files and directories on the network. Network device policy manager then adds policy rules to these permissions/privileges that enable it to control access to the devices based on the roles of the users and groups.

For performing its data surveillance, the instant network data policy manager adds data policy rules to these user/group permissions and/or device policy rules that enable it detect anomalies and generate alerts if a normal pattern/rule of data access is violated. The network data policy manager establishes these patterns/rules of normal behavior of data access by establishing a baseline of data against which other/subsequent data packets are compared for the detection of the presence of any anomaly or a deviance. It establishes individual baselines of normal data access patterns depending on the type of data sources or privileged computer systems on the network.

A baseline is established by combining the results of three main types of analyses for each and every packet of data transmitted/received: protocol analysis, user-behavior analysis, and packet analysis. Protocol analysis is performed by analyzing data/network communication protocols associated with each data packet in relation to the various networking layers of the communication stack, such as TCP/IP. Subsequently or in parallel, user-behavior analysis examines the behavior of the user involved in the communication of each packet. The analysis may be at the session level of the user whereby a user session may be reconstructed from its corresponding packets, for the purpose of analysis. Subsequently or in parallel, packet analysis is performed by deeply analyzing the content of each and every data packet involved in the communication. Packet analysis is performed by augmenting to the techniques of Deep Packet Inspection (DPI). Preferably a component of packet analysis involves comparing the content of the packet or payload to ensure that it matches the file standard that the packet is purported to belong to.

Based on the results of the three main analytical components, all the packets involved in data communication are clustered, using an unsupervised machine learning procedure that may use any machine learning algorithms, preferably k-means clustering. Clustering is achieved by scoring/weighting every packet along the three axes or factors of analysis: protocol, user-behavior and packet content. Specifically, if a packet is determined to behave in an unknown manner when compared to the known behavior of past packets i.e. signatures/data-sets, its score is incremented.

Over time as packets are analyzed and scored by the system, they tend to form clusters or populations. The technology uses an n-dimensional hypercube to conceptualize the clusters of packets as analyzed with respect to the characteristics or dimensions of analysis. The cluster with the highest and/or the densest population is chosen to be the centroid of the hypercube. The centroid represents the normal population of the data, or its baseline. Subsequent packets are then compared against this baseline by scoring/weighting them to determine their distance from the centroid. The more the score of a packet, in terms of its unknown attributes, the more its distance from the centroid.

If this distance is far enough, that constitutes an anomaly or deviance for the packet. If the score of the packet sufficiently matches any existing signatures/data-sets, an appropriate alert is generated for the admin/user who may take remedial actions. The alert may be presented using an appropriate user interface. If the packet is anomalous but does not match any existing signatures/data-sets then a user-event may be generated where the admin/user may label the packet as an existing/known security or performance issue, or a new security/performance issue, as appropriate. Preferably, the baseline continues to automatically evolve as more data keeps getting analyzed. As such the system "learns" or calibrates its baseline, and thus adapts with time.

An anomaly/deviance observed in the data may be related to a security issue of the zero-trust computer network, or preferably even a performance issue. Preferably the analytical approach taught by the design is applied to each and every data packet of the network. Preferably, a user session may also be analyzed using the above scheme, and not just the individual packets themselves. An advantageous embodiment further utilizes machine learning algorithms, including both unsupervised and supervised components.

The baselining and scoring scheme using k-means can keep the system operational and self-learning with minimal user interaction, and thus forms the unsupervised component of machine learning. When a user input is required to label a new anomaly as explained above, that forms the supervised component of machine learning. As a further part of the supervised learning, an administrator may also input user-defined rules (UDRs) to explicitly prescribe normal patterns of data access for various data sources and systems on the network.

For a detailed understanding of the above-explained rolling baseline behind the data policy management of the instant network data policy manager as a part of the instant data surveillance system, the reader is also referred to the data surveillance system taught in U.S. Pat. No. 10,848,514 B2 to Brian P. Christian and which is incorporated by reference herein for all purposes in its entirety.

In related preferred embodiments, the above data surveillance technology is used to detect if a privileged data asset or file has been shared between unauthorized users of an organization. The privileged file/asset may be associated with a specific type of computer system of an organization. For this purpose, the above taught rolling/evolving baseline is developed/established such that it is tailored for the specific computer system or data source.

In various embodiments, such a computer system connected to the zero-trust computer network of the organization may be a product lifecycle management (PLM) system, an intellectual property (IP) system, a human resources (HR) system, a financial system, a sales system, a marketing system, a planning system, a production system, an operations system, an IT security system, a source code control system, a personnel security system, an active file repository system, a workflow management system, a collaboration system such as a SharePoint™ system, a supervisory control and data acquisition (SCADA) system, or any other system of the organization. Other types of data sources monitored/surveilled by the instant technology include but are not limited to datastores, databases, file repositories, including SharePoint documents, application programming interface (API) data, internet-of-things (IoT) data, data in the cloud, etc.

Any number and type of computer systems and data sources are covered in the scope of the present embodiments. The one or more computer systems/data sources may be internal to the organization on its on-premise zero-trust computer network, such as a local area network. Alternatively, they may be in a public, private or a hybrid cloud. The computer system(s) may have users that may be dedicated for one computer system or the users may be configured on more than one such computer systems.

The various types of threats detected and as a result remediated by virtue of the instant data surveillance system include but are not limited to an intellectual property (IP) threat, an insider threat, a data exfiltration attempt, etc. The types of data file formats, documents or content protected against these threats include but is not limited to a portable document format (PDF) file, a document file, a database file, a drawing file, a presentation file, a spreadsheet file, an image file, a software code file, an intellectual property file, a text file and a binary file.

There are a variety of remedial actions that the present technology enables an organization to take once one or more of the above or other threats are detected by the instant data surveillance system and more specifically its instant network data policy manager. These include but are not limited to blocking the offending user and/or device, moving the offending user/device into a micro-segment or quarantining, shutting down a network segment, etc. Furthermore, after an anomalous security and/or performance incident is detected by the present technology, the data surveillance system establishes a context of the anomaly for further analysis. As a result, an organization can perform forensic analysis about the anomaly, which includes determining the entire chain-of-custody for the data in question.

Clearly, the system and methods of the invention find many advantageous embodiments. The details of the invention, including its preferred embodiments, are presented in the below detailed description with reference to the appended drawing figures.

DETAILED DESCRIPTION

The figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable, similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
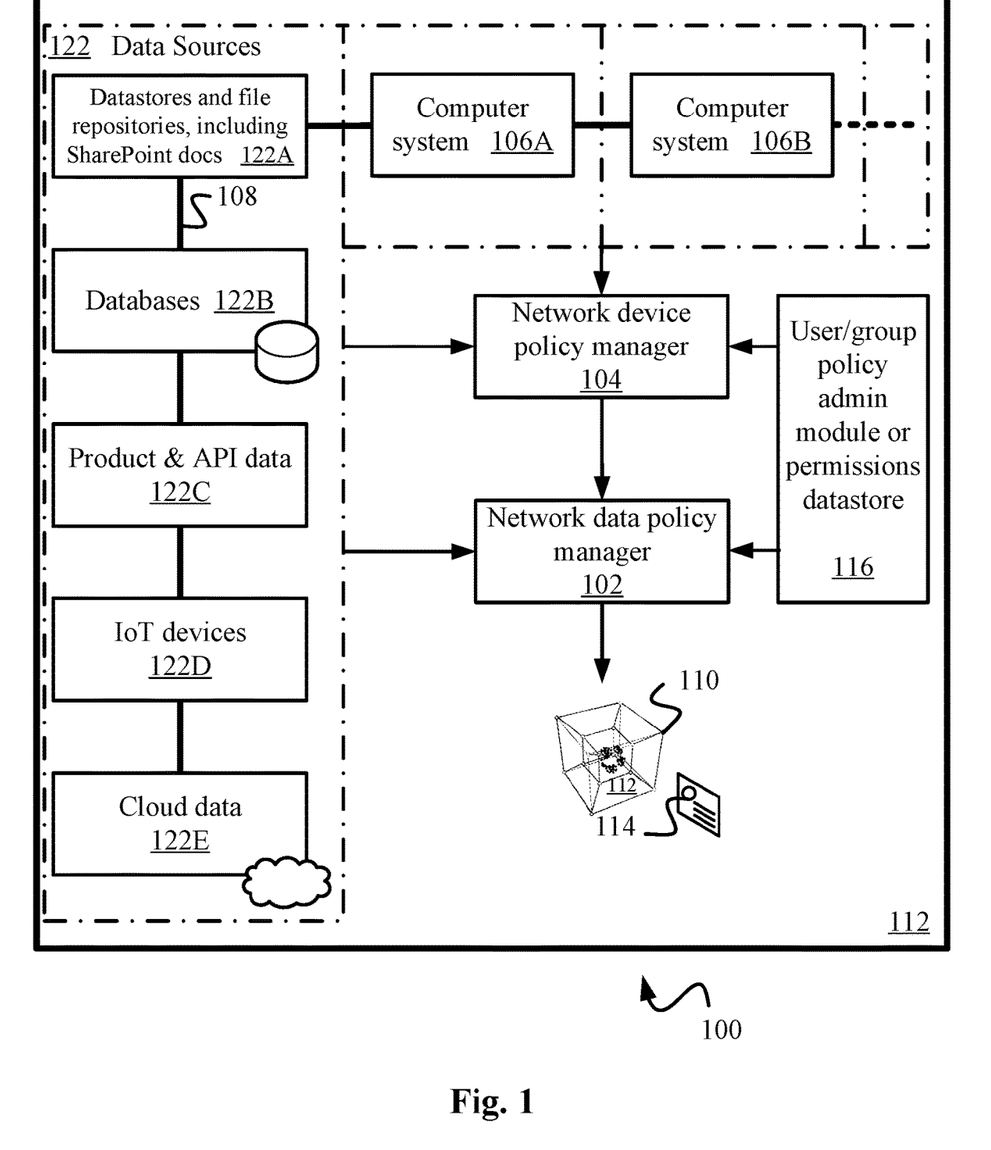
FIG. 1 is a block diagram view of a preferred embodiment of an instant data surveillance system operating in a zero-trust computer network/environment/architecture.

The techniques described herein may employ computer code that may be implemented purely in software, hardware, firmware or a combination thereof as required for a given implementation. The system and methods of the present technology will be best understood by first reviewing data surveillance system 100 as illustrated in FIG. 1. Data surveillance system 100 comprises a network data policy manager 102 that is operably connected to a network device policy manager 104 at a customer site or an organization 112.

Depending on the embodiment, the operable connection between network data policy manager 102 and network device policy manager 102 may be a tight integration where the two modules are subsumed into a single policy manager module. Such a tight integration may even take the form of a hardware-based integration where the functionalities of the two modules are implemented into the "silicon" or the semi-conductor "metal" as oftentimes expressed by skilled artisans. In contrast, the operable connection between network data policy manager and network device policy manager 102 and 104 respectively may also be a loose integration such as the one depicted in FIG. 1. In such an embodiment, data policy manager 102 and device policy manager 104 interact with each other using software application programming interface (API), system calls, network messages, file-based interactions or another appropriate computer communication scheme known in the art.

Site 112 also comprises a number of computer systems 106A, 106B, 106C . . . , connected to network 108 belonging to site/organization 112. Further, site/organization 112 may further be owned and operated by a larger organization or entity not explicitly shown in FIG. 1 to maintain focus on the main principles. As indicated by the horizontal double dot and dashed lines, computer network 108 may be a multi-segment network at site 112. Parts of computer network 108 may be physically/geographically local at a single physical location or may be remote, including in the cloud. Computer systems 106 connected to network 108 may be any type of computing devices, including mobile computing devices such as cellular phones, tablets, desktops, handhelds, laptops, etc. and even internet-of-things (IoT) devices.

According to the instant principles, computer network 108 is a zero-trust computer network. What this means is that there is no presumption of trust between the various modules or devices on network 108. The zero-trust security model (also referred to as a zero-trust architecture, zero-trust network architecture, ZTA/ZTNA, perimeter-less security), describes a security approach to the design and implementation of information technology (IT) systems.

The key principle behind zero-trust is "never trust, always verify", which means that devices should not be trusted by default, even if they are connected to a managed corporate network/LAN such as network 108 of FIG. 1, and even if the devices were previously verified. For most implementations, network 108 may also comprise cloud-based services and infrastructure, connections to remote and mobile environments, and connections to IoT devices.

The once traditional approach of trusting devices within a notional corporate perimeter, or devices connected to it via a virtual private network (VPN), does not hold in the zero-trust architecture of network 108. Instead, the zero-trust approach advocates mutual authentication, including checking the identity and integrity of devices without respect to location. Only after this verification and user authentication, access to applications and services is provided depending on the confidence of device identity and device health.

Based on the instant principles, network device policy manager 104 at site 112 is responsible for "fingerprinting" the various devices at site/organization 112 including computer systems 106. What this means is that module 104 monitors and tracks various devices on network 108 at organization 112. This monitoring and tracking are done at the hardware level by network device policy manager 104.

Explained further, network device policy manager 104 provides an observation capability into network 108 of organization/site 112, covering various security requirements. As a result, a network administrator of organization 112 can view all devices on network 108 and exercise control over what they can access. The IT team of organization 112 can thus centrally manage network policies, automatically configure devices and distribute security certificates, admit guest users, assess device health, and share information with external partners and third-party solutions without changing the current IT infrastructure.

In the preferred embodiment, the features and functionalities of such a network device policy manager 104 include:

1. Role-Based Access Control (RBAC) to Devices:

Network device policy manager 104 provides role-based access control (RBAC) to various devices on network 112. This RBAC spans across employees, contractors, and guests of organization 112 on any wired, wireless, and VPN infrastructure. It does so by interacting with a user/group or user-group policy administration module 116. Module 116 is responsible for managing granular-level permissions/privileges of various users and group on network 108 to files and directories on network 108 and specifically in data sources 122.

In exemplary implementations, such a user/group policy administration module or more simply a permissions datastore 116 may be an appropriate industrially available module such as a light-weight directory access protocol (LDAP) server or an active directory server, or the like. Device policy manager 104 adds its own device-specific policies or rules to the user-level and group-level permissions/privileges maintained by module 116. This aspect is discussed further below in reference to FIG. 2. As a result, device policy manager 104 controls device-level access to the devices on network 108 based on the role of the requesting party. The role covers user and group level access permissions or privileges of the party/user trying to or requesting access to a device on network 108.

It is important to note that the RBAC provided by device policy manager 104 does not surveil or monitor access to the data itself that resides in the devices. This job comes under the purview of network data policy manager 102 to be discussed in detail further below. The device-based RBAC provided by network device policy manager 104 to devices on zero-trust computer network 108 covers devices housing/embodying various data sources 122. Data sources 122 include but are not limited to those explicitly shown in FIG. 1, such as datastores and file repositories 122A including SharePoint documents, databases 122B, device-level access to product and API data 122C, any internet-of-things (IoT) devices 122D, cloud data 122E, etc.

Since zero-trust computer network 108 of organization/site 112 typically comprises of network hardware and software from a variety of vendors, as such, policy manager 104 preferably enforces RBAC across devices from many vendors on multi-vendor site 112.

2. Automated and Self-Service Capabilities:

By virtue of network device policy manager 104, users of network 108 can securely onboard their bring your own devices (BYOD) for enterprise. Further, they are able to register various other services such as Apple's AirPlay™, AirPrint™, Digital Living Network Alliance (DLNA), as well as Universal Plug and Play (UPnP) devices that are enabled for sharing.

The above is accomplished by network device policy manager 104 acting as a certificate authority (CA) for BYOD devices. This allows a secure, easy and preferably self-service onboarding of BYOD devices for users/employees/customers/guests of organization/site 112. Preferably, policy manager 104 also discovers all devices on zero-trust network 108 and maintains device profiles of the devices on the network. The profiles cover all endpoints, regardless of device-type. The device profiles also preferably contain other identity-centric device data including media access control (MAC) organizationally unique identifier (OUIs), dynamic host configuration protocol (DHCP) fingerprinting data, and any other identity-centric device data for use within network device policies.

Module 104 further identifies changes in device profile and dynamically modifies related authorization privileges. For example, if a printer appears as a desktop computer, module 104 can automatically deny it access.

3. Network Access Control (NAC), Network Access Protection (NAP), and Integration With Other Security Systems:

Preferably, network device policy manager 104 also provides NAP, NAC, security posture and health-checks across heterogenous site 112 containing a variety of network computing hardware and software. Furthermore, policy manager 104 can be easily integrated with other network/internet security systems, that may be third-party systems. This is accomplished using APIs, exemplarily HTTP/RESTful APIs, in order to automate workflows that would otherwise require manual IT intervention. One example of such an integration is that with a mobile device management system (MDM), for leveraging device inventory and posture information, which enables well-informed policy decisions to be implemented by policy manager/module 104.

4. Bring Your Own Device (BYOD) Certificate Authority (CA):

As noted above, network device policy manager 104 preferably also acts as a CA for BYOD devices. This allows secure, easy and preferably self-service onboarding of BYOD devices for users/employees/customers/guests of organization/site 112. Explained further, when new devices are added to computer network 108, device policy manager 104 validates those devices and upon validation, issues them digital certificates.

Henceforth, these devices use these digital certificates to authenticate themselves to various other modules and services at organization 112 and computer network 108.

5. Single Sign-On (SSO) and Automatic Sign-On Support:

Policy manager 104 further preferably supports SSO and automatic sign-on support. This is preferably accomplished by implementing an appropriate standard for exchanging authentication and authorization data between parties, in particular, between an identity provider (IdP/IDP) and a service provider. An example of such a standard is Security Assertion Markup Language (SAML), exemplarily SAML v2.0.

Furthermore, any SSO to social media websites such as Facebook™, Twitter™, LinkedIn™, Office365™, Google Apps™, etc. preferably includes access delegation by implementing an appropriate standard such as Open Authorization (OAuth) and preferably OAuth2.

6. Enterprise Reporting, Monitoring, and Alerting:

Preferably, there is a large selection of security reports available from network device policy manager 104 for the benefit of security administrators of site 112 for devising and implementing the requisite device security policies. This includes reports of all user authentication failures and successes.

7. Customization, Guest Access, etc.:

Preferably, network device polity manager 104 provides a web-based interface that simplifies policy configuration and troubleshooting. The interface is also customizable for branding and specific implementations at various sites. Policy manager 104 also preferably supports IPV6 and includes an interface for IPV6 administration.

In an exemplary embodiment of the present technology, network device policy manager 104 of FIG. 1 and the present teachings is ClearPass Policy Manager from Aruba®.

After having discussed the capabilities of network device policy manager 104, let us now direct our attention to network data policy manager 102. As noted above, a key responsibility of network device policy manager 104 discussed above is to provide role-based access control to the various devices of zero-trust network 108. However, it is the responsibility of network data policy manager 102 to monitor or surveil access to the data itself that resides or housed in these devices.

Data policy manager 102 performs data surveillance on zero-trust computer network 108 for identifying security and/or performance issues. It accomplishes this by establishing a baseline of data packets against which other or subsequent data packets are compared for the detection of the presence of any anomalies or deviances. The baseline is established by combining the results of three main types of analyses for each and every packet of data transmitted/received: protocol analysis, user-behavior analysis, and packet analysis.

Protocol analysis is performed by analyzing data/network communication protocols associated with each data packet in relation to the various networking layers of the communication stack, such as TCP/IP. Subsequently or in parallel, user-behavior analysis examines the behavior of the user involved in the communication of each packet. The analysis may be at the session level of the user whereby a user session may be reconstructed from its corresponding packets, for the purpose of analysis. Subsequently or in parallel, packet analysis is performed by deeply analyzing the content of each and every data packet involved in the communication. Packet analysis is performed by augmenting to the techniques of Deep Packet Inspection (DPI).

Based on the results of the three main analytical components, all the packets involved in data communication are clustered, using an unsupervised machine learning procedure that may use any machine learning algorithms, and preferably k-means clustering. Clustering is achieved by scoring/weighting every packet along the three axes or factors of analysis: protocol, user-behavior and packet content. Specifically, if a packet is determined to behave in an unknown manner when compared to the known behavior of past packets i.e. signatures/data-sets, its score is incremented.

Over time as packets are analyzed and scored by the system, they tend to form clusters or populations. The technology uses an n-dimensional hypercube to conceptualize the clusters of packets as analyzed with respect to the characteristics or dimensions of analysis. Such a hypercube 110 with its centroid 112 is shown in FIG. 1. The cluster with the highest and/or the densest population is chosen to be centroid 112 of hypercube 110. The centroid represents the normal population of the data, or its baseline 114 as shown. Subsequent packets are then compared against baseline 114 by scoring/weighting them to determine their distance from the centroid. The more the score of a packet, in terms of its unknown attributes, the more its distance from the centroid.

If this distance is far enough, that constitutes an anomaly or deviance for the packet. If the score of the packet sufficiently matches any existing signatures/data-sets, an appropriate alert is generated for the admin/user who may take remedial actions. The alert may be presented using an appropriate user interface. If the packet is anomalous but does not match any existing signatures/data-sets then a user-event may be generated where the admin/user may label the packet as an existing/known security or performance issue, or a new security/performance issue, as appropriate.

Preferably, baseline 114 continues to automatically evolve as more data keeps getting analyzed. As such, as a part of its data policy management, network data policy manager 102 "learns" or calibrates its baseline 114, and thus adapts with time. It therefore continuously evolves its data policies and/or their rules on computer network 108, and continually updates its notion of what is a normal behavior or normal pattern(s) of data access for each type of data source in data sources 122 shown in FIG. 1.

An anomaly/deviance observed in the data may be related to a security issue of the zero-trust computer network, and/or even a performance issue. Preferably the analytical approach taught by the design is applied to each and every data packet of the network. Preferably, a user session may also be analyzed using the above scheme, and not just the individual packets themselves. Preferably packet analysis performed by module 102 utilizes Deep Packet Inspection (DPI). Preferably a component of packet analysis involves comparing the content of the packet or payload to ensure that it matches the file standard that the packet is purported to belong to.

Advantageous embodiments further utilize machine learning algorithms, including both unsupervised and supervised components. The baselining and scoring scheme using k-means can keep the system operational and self-learning with minimal user interaction, and thus forms the unsupervised component of machine learning. When a user input is required to label a new anomaly as explained above, that forms the supervised component of machine learning. Thus, in some embodiments, user-defined rules (UDRs) are entered by qualified administrators/users into data policy manager 102 that prescribe the normal patterns/behaviors of data access for various types of data sources 122.

Data surveillance system 100 may be architected to include a data monitoring module whose function is to monitor each packet of incoming/outgoing data packet, and copy/mirror it for analytical purposes. The system may also have a data analysis module which is assigned the overall task of packet and/or session analysis. In conjunction with the data analysis module, there may a protocol analysis module to analyze the networking protocols of data packets, a user-behavior analysis module to incorporate the behavior of user in the analysis, and a packet analysis module responsible for analyzing the content of every packet.

While analyzing user-behavior corresponding to a packet, it may be prudent to combine the device information along with the user behavior. The user-behavior analysis module preferably considers other "like" users (or other like user/device pairs) in the organization who may be attributable to the same/similar data anomaly or deviance as may be observed for the packet in question. The data surveillance system may detect a large variety of security issues, including data intrusions, data exfiltration/theft, insider threats, data loss/leak, steganographic attempts, etc. Furthermore, the system may also detect performance issues that may be attributable to a system malfunction or deterioration.

The present techniques further teach maintaining various layers of metadata associated with the various types of analyses performed by the system. Specifically, there is metadata associated with the packets, sessions, packet headers and packet payloads. This metadata is updated as a part of the packet capture regime of the data surveillance system of the present technology. There is also a session metadata layer which consists of metadata associated with a user session, header metadata layer which consists of metadata specifically related to the packet header(s), and payload metadata layer which consists of metadata specifically related to the packet payload.

Packet metadata may contain information about the packet related to its security or performance characteristics including whether the packet has a known or unknown security issue, the number of retransmits for the packet, whether there are superfluous packets in the transmission and the overall packet score when compared to baseline 114, etc.

Session metadata may contain information required to reconstruct a given session. User-behavior metadata may contain information related to the particular user associated with the packet or session being analyzed, including typical applications used, geography/location, device(s), previous security issues by that or "like" users, traffic patterns, file-type usage, etc. There is also a catchall miscellaneous metadata layer that may consist of any useful information about data not easily attributable to other metadata layers. In the preferred embodiment, various analytics are performed on user-behavior and the catchall metadata layers via a metadata analytics module.

Preferably, the system analyzes data according to the disclosed techniques in real-time or on a near real-time basis. Preferably, the system analyzes the data on a batch basis by analyzing a historical version of data. This may be required to perform a forensic or chain-of-custody analysis after a security incident.

In a set of highly preferred embodiments, the drift of the centroid of the above-mentioned conceptual hypercube is recorded and analyzed to recognize patters that may be correlated to the activities of the organization. Such a pattern may be visualized on a scatter-graph/scatter-plot and used to reveal the relationship of events in the organization to the movement of the centroid. The activities or events may be caused by an "act of man" such as technical or technological breakdowns of the equipment/machinery in the facility, or they could be caused by an "act of god", such as flooding or fire.

In any case, the network traffic associated with the response of the organization to such events or incidents causes the centroid to move/drift in certain patterns. The observed movement or drift of the centroid is characteristic of the response of the organization to the above events and may be recorded or analyzed over a given period of time, such as seconds, minutes, hours, days, weeks, etc. Such patterns are learned by the evolving or "rolling" baseline of the system over time and are recognized as normal events. The present design avoids issuing false positives for such events in the future, unlike the static systems of the prior art.

The payloads of the data packets are hashed using fuzzy or context triggered piecewise hashing (CTPH), or any other type of hashing including message digest 5 (MD5), secure hash algorithm (SHA), etc. The choice of the hashing scheme employed depends on the type of the files that the data packets belong to. The one or more hashes, such as CTPH hashes of the packets are then stored in the database. As subsequent packets pass through the network, the system compares the fuzzy hashes of the packets to determine if the packets are close to a previous set of hashes associated with an event. Thus, fuzzy hashing is used to identify an anomaly in the data, such as a security attack or a performance issue. The security attack may be a data exfiltration attack/attempt. Furthermore, the payload of the packet is compared to the standard of the file that the packets are purported to belong to.

In these embodiments as well, machine learning techniques are also employed to learn the movement or the drift of the centroid with respect to the baseline. First, unsupervised learning using techniques such as k-means clustering is employed to determine the clustering of individual data packets. A human expert/administrator may then label or score the data packets associated with unknown security events or adjust the present scores of the packets, thereby forming the supervised component of the learning of the system.

In another set of highly preferred embodiments, the above data surveillance techniques are used to establish the contexts for events of interest occurring in the organization. The events again may be man-made (security events, performance events, etc.) or due to natural causes. The context contains all the relevant information related to the event/incident captured by the above-discussed protocol analysis module, user-behavior analysis module and packet-analysis module. The context is then provided or made available to a response team who can proactively take actions in the "kill chain" of the event earlier than otherwise possible using the prevailing techniques.

The context of the event is attached/correlated to the entries of the server logs of the network of the organization. This additional and timely context/insight allows the response team to more quickly determine if the event is a false positive or a real positive and take remedial actions on a preventive or "precog" manner. The context may also be provided to any proxy servers on the network that may automatically block the event before it causes any harm to the network. The proactive/preventive ability of such an automatic and/or manual intervention by a response team possible with the present design allows for a dynamic security policy management. It is one of the important innovations of the present design. The rest of the relevant teachings of the prior embodiments apply to the present embodiments also.

In yet another set of highly preferred embodiments, the above data surveillance techniques are deployed in a "community capture" manner. What this means is that, rather than having a single/dedicated data surveillance system attached to the network, each device of a host network participates in identifying security/performance anomalies of the network from the earlier teachings. More specifically, a device or computer is first chosen as a master from amongst the various devices/computers of the network. The election/selection of the master device is preferably quorum-based, and in the event of a failure/failover, a replacement master is elected. Alternatively, a backup/standby master is designated as a hot or cold standby to serve as the new/replacement master if the original master fails.

A portion/component of the system that is responsible for establishing the rolling baseline is deployed on the master device. The portion/component of the system responsible for scoring packets against the baseline is deployed on a subset or all other (non-master) devices, as an agent software/layer. Note, that it is possible to deploy the entire software system of the prior teachings on both the master and agent devices. However, the master device only builds the baseline and communicates it to the agents, and the agents score the packets seen by their respective devices against the baseline received from the master. The present embodiments thus provide for "agent-izing" the aforementioned data surveillance techniques in a distributed manner.

The agent software running on an agent device also mirrors/copies each packet of data seen (sent/received) by that device, to the master device. The master thus receives the packets seen by all agent devices. Based on these packets, the master thus builds or establishes a baseline of data with its centroid per prior teachings. It then communicates this baseline with its centroid to the agent devices. As the baseline evolves/rolls, the master ensures that it sends incremental updates to the agents to keep them up-to-date with the latest version of the baseline.

The agents then score each packet coming in or going out of the corresponding agent device against the baseline received from the master. The scoring is performed based on the calculation of the distance of each packet from the centroid of the baseline per earlier embodiments. Based on the scoring of the packets, the agents issue an appropriate alert if a security and/or performance anomaly is detected. Each agent thus monitors the packets received/sent by its device and raises alerts based on the baseline established by the master, in a master/agent community environment. The agents thus also keep a local/localized copy of the baseline that they update as they score the data packets. The agents may be bundled with other pre-existing agents in the network in the form of a library of files to be invoked by the pre-existing agents as needed.

In the event of a failure/failover of the original master, a replacement/new master is chosen/elected. In one embodiment, if the replacement master does not satisfy the "adequacy" or resource requirements, additional nodes are added to the master cluster in a distributed computing fashion until the adequacy requirements are satisfied. The adequacy requirements are driven by the capabilities of the original master.

During the time that a replacement/new master is being elected, the agent devices continue to receive data packets and score them against their baseline previously established and received from the failed master. Therefore, when the new master comes online, it first reconciles the baseline using a baseline reconciliation process. During this process, it requests each agent to replay their packets to the master so that the new master can reestablish a new rolling baseline. Alternatively, it may ask the agents to just send incremental changes to their local baselines so it can form a new and up-to-date baseline. Subsequently, the new master "re-syncs" with the agents by communicating them the newly established rolling baseline.

In still another set of highly preferred embodiments, the above data surveillance technology is used to detect if a privileged data asset or file has been shared between unauthorized users of an organization. The privileged file/asset may be associated with a specific type of computer system of an organization. For this purpose, the above taught rolling/evolving baseline is developed/established such that it is tailored for the specific computer system.

In various embodiments, computer systems 106 connected to the zero-trust computer network of the organization may include a point-of-sale (POS) system e.g. system 106A, a product lifecycle management (PLM) system e.g. system 106B, an intellectual property (IP) system, a human resources (HR) system, a financial system, a sales system, a marketing system, a planning system, a production system, an operations system, an IT security system, a source code control system, a personnel security system, an active file repository system, a workflow management system, a collaboration system such as a SharePoint™ system or any other system of the organization.

Computer systems 106 of FIG. 1 may also include supervisory control and data acquisition (SCADA) systems. In such a scenario zero-trust computer network 108 may be a closed/private network or not. Such SCADA systems have a control architecture that comprises any number of computers, networks, user interfaces, sensors, devices, programmable logic controllers (PLCs), etc. for supervising manufacturing/production plants and machinery. The SCADA architecture comprises of various levels, such as Levels 1-4, and includes a number of control elements or components. These include supervisory computers, remote terminal units (RTUs), programmable logic controllers (PLCs), communication infrastructure, and human-machine interface.

Exemplary SCADA systems that may be deployed as computer systems 106 on zero-trust network 108 of FIG. 1, include SCADA systems for:

Chemical manufacturing or processing
Power generation
Oil/Gas processing
Water treatment
Telecommunication
Transportation
Agriculture
Food and beverage production The above are some examples of the many types of computer systems 106 of FIG. 1 that may benefit from the present data surveillance techniques. Any number and type of computer systems 106 are covered in the scope of the present embodiments. The one or more computer systems may be internal or external to the organization. Per above, zero-trust computer network 108 have on-premise segments of a local area network (LAN), and/or it may have segments in a public, private or a hybrid cloud. The computer system(s) 106 may have users that may be dedicated for one computer system or the users may be configured on more than one such computer systems. The data related to such computer systems may comprise various types of files, including portable document format (PDF/pdf) files, document files, drawing files, presentation files, spreadsheet files, image files, software code files, intellectual property files, text files, binary files, etc. These files, along with their metadata and hash signatures, may then be stored in a database that is dedicated to a particular computer system 106 or be shared amongst more than one computer systems.

Based on the chief aspects of the present embodiments, the rolling baseline based on above teachings is thus established by the instant data surveillance system 100 of FIG. 1, and specifically its network data policy manager 102 depending on the type of data of a particular computer system 106, such as a POS system, or the type of data residing in a data source 122, such as cloud data 122E. The baseline includes CTPH hash signatures computed by the instant surveillance system of complete files of the computer system. In other words, the baseline of the present embodiments includes CTPH signatures of individual data packets as well as complete files associated with the computer system for which the baseline is being established.

In addition, the surveillance system also monitors data packets being transmitted over zero-trust computer network 108 at large and not specific to one computer system 106 or data source 122. The surveillance system then scores the data packets on the zero-trust computer network against the baselines for specific computer systems. In other words, it scores them based on their distance from centroids of the baselines for specific computer systems. In related variations, a single composite baseline may be developed containing centroids representative of normal populations of multiple computer systems.

Network packets are scored by performing distance calculation or matching of their CTPH hashes from the hashes of the files of the computer systems. In other words, a CTPH hash is computed for each network packet sensed by the surveillance system. The hash is then compared against the hash signature of the file in the database of the instant data surveillance system. The surveillance system also measures the user-behavior, protocol and other characteristics of the data packets of the network per above teachings. In the case of user-behavior characteristics, the surveillance system determines access privileges of users by interfacing with the appropriate authorization database tables or permissions datastore 116, or other constructs such as an application programming interface (API) of the computer system.

If the above discussed comparison of hashes reveals a match or closeness of the network packet to a file of the computer system, while the other characteristics of the network packet do not match the centroid of the baseline, then this signifies an anomaly. The anomalies are recorded in a ledger that may be reviewed manually or programmatically. Exemplarily, a privileged file/asset of the organization may have been intentionally or unintentionally shared between unauthorized users of the organization. The present technology thus allows for an early detection of such a potential data leak event. In related variations, the users of the above computer systems may be external partners of the organization.

For even a more detailed understanding of the above-explained rolling baseline behind the data policy management of instant network data policy manager 102 of data surveillance system 100 of FIG. 1, the reader is also referred to the data surveillance system taught in U.S. Pat. No. 10,848,514 B2 to Brian P. Christian and which is incorporated by reference herein for all purposes in its entirety.

Let us now even further expand our understanding of the network data policy manager 102 of FIG. 1. Per above, policy manager 102 analyzes incoming data and data in motion across zero-trust computer network 108 as well as data leaving the network, on a real-time or near-real-time basis. It does so, in order to identify security threats/anomalies and thus to help prevent the threats leading to data tampering, data loss, and data theft/exfiltration. Manager/module 102 analyzes the data together with its context, and creates a rolling baseline of normal data patterns per present explanation as well as the incorporated teachings of U.S. Pat. No. 10,848,514 B2 to Brian P. Christian.

As a result of the above-mentioned analysis, data policy manager 102 can identify and make visible any anomalous usage of data, or unauthorized access to privileged assets/data, as well as the related threat actors. It further performs forensic analysis on anomalistic data for security experts, also referred to as security defenders. This analysis provides reports to the security defenders on a real-time or near real-time basis that includes chain-of-custody information. The chain-of-custody information identifies the user who accessed the privileged content/data, from which device, which location, date/time of access and how accessed i.e., using what methods, protocols or applications.

Per above, network data policy manager 102 establishes and then continuously updates the rolling baseline of normal data patterns and activity. As a consequence of knowing this baseline, organization 112 can more efficiently deploy new DLP and other security systems. This is at least because, security policies implemented in these other security systems can be more finely tuned as a result of the insights and visibility afforded by the baseline and associated data patterns provided by network data policy manager 102.

Let us now review some specific use cases representing threats identified by network data policy manager 102 of FIG. 1 on zero-trust computer network 108 of organization/site 112.

Privileged data may be any sensitive/confidential data of organization 112 that may be considered its intellectual property (IP). This includes data related to its inventions, patent filings, trademarks, copyrights, etc. This data comprises data files, pictures, pdfs, etc. in any appropriate file formats, and as such threat to such IP data are termed as IP threats.

As one use-case, data policy manager 102 protects any such privileged data by analyzing its content via its rolling baseline and in association with the context of its use. It knows normal patterns of the flow/use of this data on zero-trust network 108, which allows it to track and immediately detect any deviation in pattern of flow/use. Based on the content and structure of the data files, it can detect copies of such data file. As a result, data policy manager 108 further understands data modifications, file structure changes, and unusual applications/devices/locations/triggers of the usage of the data files.

In the prevailing art, such activities would go unnoticed on zero-trust networks until suspicion is triggered through other tools that notice large unusual file downloads or email attachments being sent to non-business locations. In contrast, network data policy manager 102 provides visibility into normal data usage for users based on their roles, user group memberships, affiliated business units/divisions, or any combination. When data not normally used by a user group is suddenly harvested, network data policy manager 102 detects this anomaly and generates an appropriate alert. It further captures this alert in reports that provide a comparison of this event to the normal baseline. This information enables security teams to perform further investigation and to prevent sensitive data modification or loss in the future.

As another use-case of data policy manager 102, business enterprises such as those operating/owning organization/site 112 often need to share data on zero-trust computer network 108 with third parties, such as vendors/suppliers, research partners, and outside agencies. How third parties are allowed to use data is further governed by contractual obligations and/or regulations. This data sharing in shared environments in a zero-trust architecture is very challenging using the techniques of the prior art. Network data policy manager 102 solves this zero-trust data sharing problem at least by providing detailed chain-of-custody information on privileged data to security experts/defenders. They are able to identifying the who, the when, the where, and the how of privileged/IP data access per above. This chain-of-custody information is also invaluable for legal discovery, criminal investigation, compliance, and for verifying third-party agreements.

As yet another use-case, security teams at organizations, such as organization 112 operating a zero-trust computer network 108, are often inundated with a large number of alerts about security incidents and threats. A vast majority of these alerts are false positives. Thus, the security experts often struggle to identify the true threats affecting the network. As a result, identifying a breach is often a slow process, allowing sophisticated attackers remain in computer network 108 for months, even years, without being detected using prevailing technologies. Even after a breach is discovered, security teams frequently lack adequate forensic data to know what portions of the data was exposed and how to effectively respond, and to make any appropriate announcements.

Network data policy manager 102 solves this problem, thus enabling the security teams to accelerate their breach response and remediation actions. This is at least as a result of the insights into the rolling baseline of the normal behavior of sensitive/privileged data on zero-trust computer network 108. This is also because of the forensic capabilities of the policy manager 102 per above. In summary, the capabilities afforded by network data policy manager 102 of a zero-trust network based on instant principles gives security experts/analysts continuous visibility into the movement of sensitive data across the network.

Anomalies are spotted as they occur, with accompanying contextual details so that security teams can more efficiently respond and take remedial actions. Furthermore, data policy manager 102 can send its anomalistic data alerts to the security information and event management (SIEM) system of an organization, as well as its ticketing and orchestration systems further automating the threat response and remediation options for the security teams.

Figure 2:
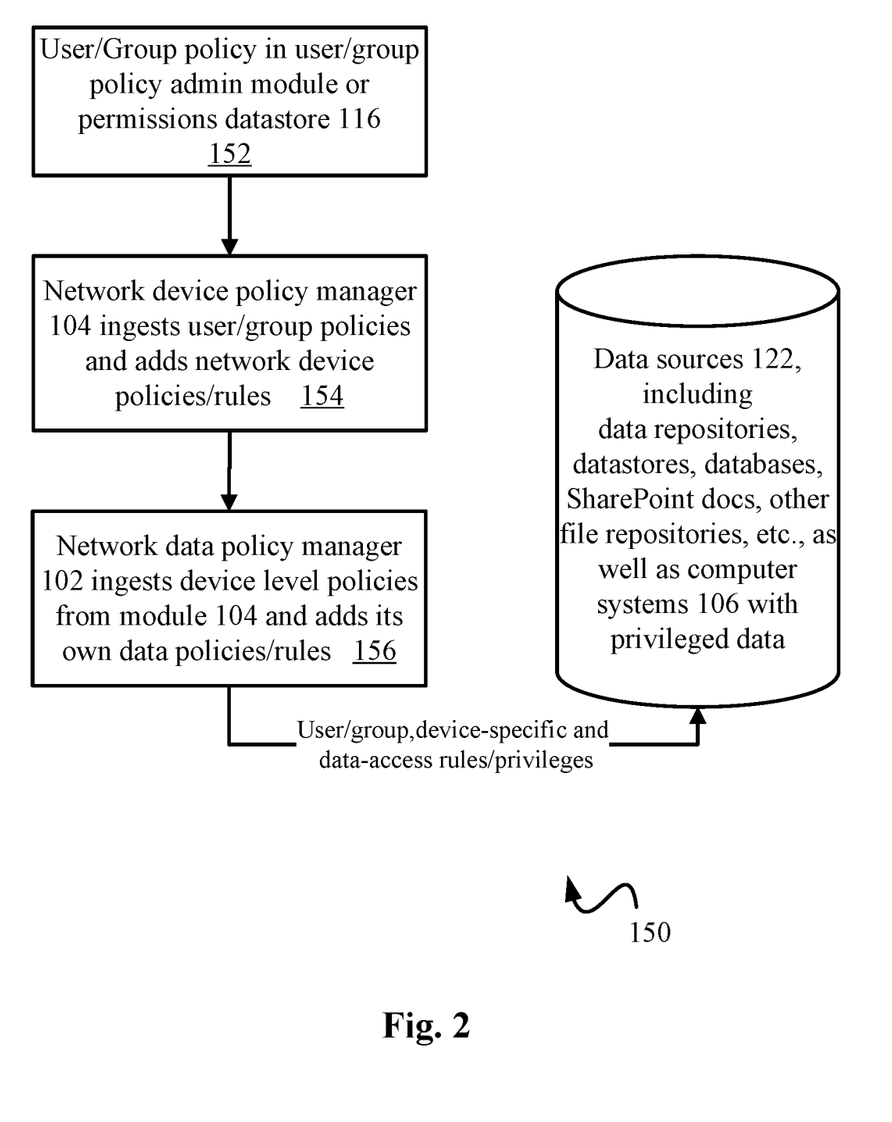
FIG. 2 is flowchart showing the flow of various policy/rules in a zero-trust environment based on the instant principles.

FIG. 2 shows in a flow diagram or flowchart 150, the flow of various policies and related rules in an instant data surveillance system 100 operating in the zero-trust environment or zero-trust computer network 108 of FIG. 1. More specifically, FIG. 2 shows that as a first step 152 on zero-trust computer network 108 of FIG. 1, the user and group profiles or permissions or privileges are maintained in a user/group policy administrator system/module or permissions datastore 116 shown and discussed above in reference to FIG. 1. Module 116 is responsible for managing/maintaining and enforcing policies related to individual users and groups and their permissions/privileges on files and directories on network 108.

In exemplary implementations, such a user/group policy administration module may be an appropriate industrially available module such as a light-weight directory access protocol (LDAP) server or an active directory server, or the like. Recall from prior discussion, the network device policy manager 104 of FIG. 1 enforces role-based access control (RBAC) on various devices on network 108. It does so by inheriting/importing/ingesting and/or accessing permissions/privileges from permissions datastore 116 discussed above. This is indicated by step 154 in FIG. 12.

Explained further, user/group policy administration module enforces permissions on a granular level on files and directories on network 108, while device policy manager 104 uses these permissions to enforce broader role-based access control policies to the devices on network 108. It does so by incorporating or inheriting or accessing or ingesting user/group permissions from user/group policy admin module 116 and adding its own rules that govern access to specific devices on network 108.

Exemplarily, user/group policy admin module 116 of FIG. 1 may prescribe that user John Doe has write-access to file xyz in directory abc. However, it is module 104 of FIG. 1 that ultimately determines that even if John Doe can write to file xyz, he should be denied access based on the device policies of network 108. This may be because file xyz is a device driver file for a privileged device on network 108 where John Doe has insufficient privileges based on his role on zero-trust network 108 to be granted such an access to the device.

Then at step 156, network data policy manager 102 of the instant design inherits the device-level policies/rules managed by network device policy manager 104. It may also directly access permissions datastore/repository 116 as shown in FIG. 1. It then adds its own data-access rules that define what should be normal and not-normal for accessing specific types of data in various data sources 122 and computer systems 106 shown originally in FIG. 1 and summarized again in FIG. 150 for completeness. Data policy manager 102 does so by establishing a baseline for the normal behavior for data access and evolving this baseline overtime per above teachings for its data policy management.

Once a specific pattern or patterns are learned about a specific data source, it is incorporated into a data-access policy. The data-access policy determines that if a pattern falls outside of the rules, or in other words represents an anomaly. In such a case, an appropriate alert/notification is generated and an appropriate remedial response is taken. Such remedial responses on zero-trust network 108 of FIG. 1 may be performed by network device policy manager 104 and can vary greatly. These actions may include logging out and/or blocking the offending user/device, quarantining the offending user and/or device into a micro-segment of network 108 thus preventing further threats to the overall network, shutting down a network segment, etc.

In related variations, instead of or in addition to the unsupervised learning of the normal data access patterns for various data sources, network data policy manager 102 also allows entry of user-defined rules or UDRs. Such user-defined rules form the supervised learning component of the present technology, and allow an administrator to explicitly specify policy rules for accessing data according to the various data sources. If a data access request violates the rules, an appropriate alert/notification of the above teachings is generated.

Figure 3A:
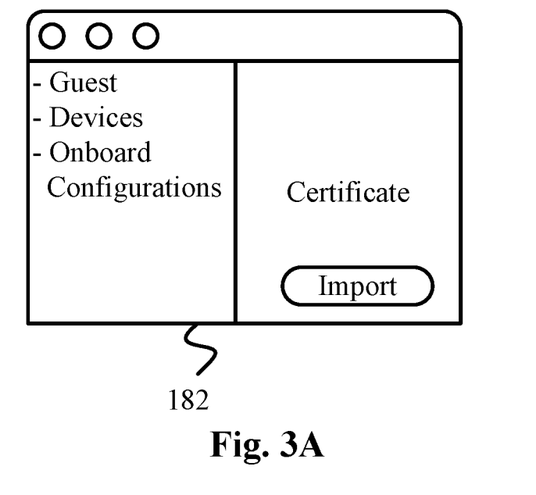
FIG. 3A illustrates a screen mockup from an exemplary implementation for importing a digital certificate to authenticate an instant network data policy manager.

Now, while still referring to FIG. 1, and more specifically to the loose integration between network device policy manager 102 and network data policy manager 102, FIG. 3A illustrates a screen mockup 182 showing a digital certificate for instant data policy manager 102 that is being imported by/to network device policy manager 104. This is the certificate that data policy manager 104 needs to "present" or upload or import by/to network device manager 102 in order to authenticate itself. The import button shown in mockup 182 is use to initiate the actual import of the digital certificate.

Figure 3B:
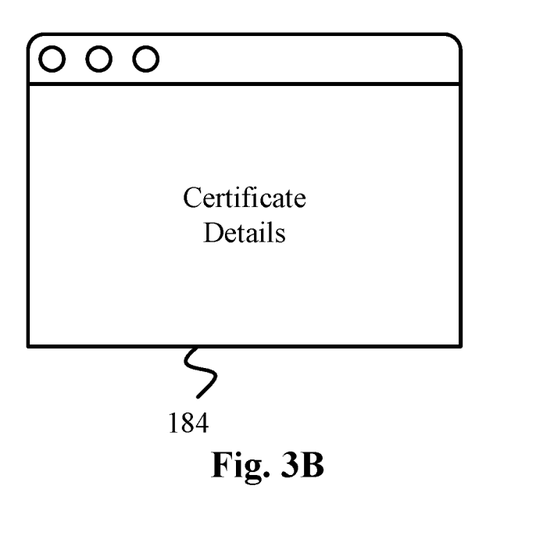
FIG. 3B shows a screen mockup showing the details of the digital certificate once a user clicks on the certificate details link from the mockup of FIG. 3A.

If the user clicks on the certificate link in mockup 182, he/she is brought to a certificate management screen represented by screen mockup 184 shown in FIG. 3B containing the various certificate details. These details include the name of the entity that the certificate is issued to, valid from/to dates, subject, issuer details, a hash or a secured hash algorithm (SHA) fingerprint, the private key associated with the certificate, etc.

Figure 4A:
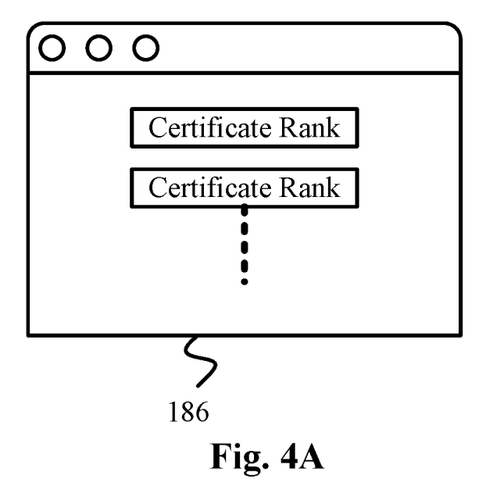
FIG. 4A presents a screen mockup showing the trust chain of the digital certificate from the mockups of FIG. 3A-B.
Figure 4B:
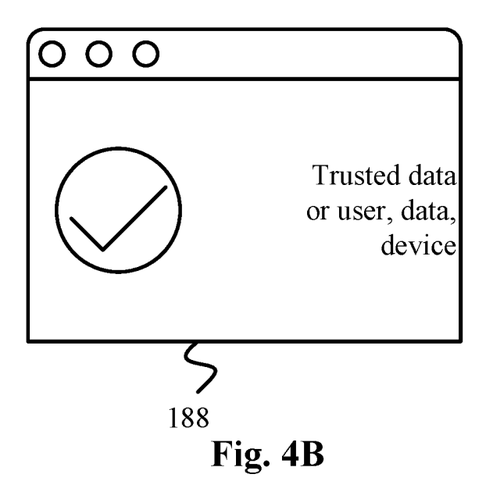
FIG. 4B presents a screen mockup showing the client information associated with the digital certificate of the mockups of FIG. 3A-C.

In a similar manner, FIG. 4A shows a certificate trust chain screen entered by clicking a link on mockup 184 of FIG. 3B, and represented by screen-mockup 186. As shown, it shows the ranks of various certificates in the trust chain of the above certificate in question that was needed to authenticate our data policy manager 102 of FIG. 1. Now, by clicking a client information link in the certificate management screen shown by screen mockup 184 of of FIG. 3B above, the user is brought to a client information screen represented by screen mockup 188 of FIG. 4B. As shown, the client information screen shows various details related to the client entity to which the above certificate is issued. Such information may include the trusted data or user(s), data or device(s) associated with the client.

In view of the above teaching, a person skilled in the art will recognize that the apparatus and method of invention can be embodied in many different ways in addition to those described without departing from the principles of the invention. Therefore, the scope of the invention should be judged in view of the appended claims and their legal equivalents.

What is claimed is:

1. A computer-implemented method executing by at least one microprocessor, computer-readable instructions stored in a non-transitory storage medium coupled to said at least one microprocessor, said method comprising the steps of:
    (a) integrating data policy management into network device policy management of a zero-trust computer network;
    (b) defining by said data policy management, a normal behavior of a first dataset on said zero-trust computer network;
    (c) analyzing a second dataset on said zero-trust computer network;
    (d) establishing an evolving baseline of said first dataset by assigning each packet of said first dataset to a cluster of packets of said first dataset amongst a plurality of clusters of packets of said first dataset, said evolving baseline representing said normal behavior;
    (e) computing an absolute distance between said each packet of said first dataset and a center of said cluster of said packets of said first dataset;
    (f) scoring, based on its distance from a centroid of said evolving baseline, each packet of said second dataset; and
    (g) based on said distance, determining if said each packet of said second dataset represents an anomaly in said zero-trust computer network.

2. The computer-implemented method of claim 1 accessing a permissions datastore for said network device policy management and for said data policy management.

3. The computer-implemented method of claim 1, wherein said first dataset is related to at least one of a datastore, a file repository, a database, an application programming interface (API), an internet-of-things (IoT) device and a cloud.

4. The computer-implemented method of claim 1 taking remedial action by said network device policy management in response to said anomaly.

5. The computer-implemented method of claim 1, wherein said remedial action includes blocking an offending user, blocking an offending device, moving an offending user to a micro-segment, moving an offending device to a micro-segment and shutting down a network segment.

6. The computer-implemented method of claim 1 performing a forensic analysis of said second data after said determining of said anomaly in said step (g).

7. The computer-implemented method of claim 1, wherein said forensic analysis includes determining a chain-of-custody information of said second data.

8. The computer-implemented method of claim 1, wherein said anomaly is caused by one or more of an intellectual property (IP) threat, an insider threat and a data exfiltration attempt.

9. The computer-implemented method of claim 1, wherein said second data is associated with one or more of a point of sale (POS) system, a product lifecycle management (PLM) system, a supervisory control and data acquisition (SCADA) system, an intellectual property (IP) system, a human resources (HR) system, a financial system, a sales system, a marketing system, a planning system, a production system, an operations system, an information technology (IT) security system, a source code control system, a personnel security system, an active file repository system, a workflow management system and a collaboration system.

10. The computer-implemented method of claim 9, with said first data comprising one or more of a portable document format (PDF) file, a document file, a drawing file, a presentation file, a spreadsheet file, an image file, a software code file, an intellectual property file, a text file and a binary file.

11. The computer-implemented method of claim 9 further establishing a context of said anomaly in said zero-trust computer network.

12. A data surveillance system including computer-readable instructions stored in a non-transitory storage medium and at least one microprocessor coupled to said storage medium for executing said computer-readable instructions, said data surveillance system further comprising:
(a) a network data policy manager operably connected to a network device policy manager of a zero-trust computer network of an organization, and wherein said at least one microprocessor is configured to:
(b) define a normal behavior of a first data on said zero-trust computer network by analyzing it by said network data policy manager;
(c) analyze a second data on said zero-trust computer network by said network data policy manager;
(d) establish a rolling baseline of said first data by assigning each packet of said first data to a cluster of packets of said first data amongst a plurality of clusters of packets of said first data, wherein said rolling baseline represents said normal behavior;
(e) compute an absolute distance between said each packet of said first data and a center of said cluster of said packets of said first data;
(f) score, based on its distance from a centroid of said rolling baseline, each packet of said second data; and
(f) (g) based on said score, determine if said each packet of said second data represents an anomaly in said zero-trust computer network.

13. The data surveillance system of claim 12, wherein said network data policy manager accesses a permissions datastore module on said zero-trust computer network for said data policy management.

14. The data surveillance system of claim 12, wherein said first dataset is related to at least one of a datastore, a file repository, a database, an application programming interface (API), an internet-of-things (IoT) device and a cloud.

15. The data surveillance system of claim 12, wherein said at least one microprocessor is further configured perform a forensic analysis of said second data in said element (f).

16. The data surveillance system of claim 15, wherein said forensic analysis includes determining a chain-of-custody information of said second data.

17. The data surveillance system of claim 12, wherein said anomaly is caused by one or more of an intellectual property (IP) threat, an insider threat and a data exfiltration attempt.

18. The data surveillance system of claim 12, wherein said second data is associated with one or more of a point of sale (POS) system, a product lifecycle management (PLM) system, a supervisory control and data acquisition (SCADA) system, an intellectual property (IP) system, a human resources (HR) system, a financial system, a sales system, a marketing system, a planning system, a production system, an operations system, an information technology (IT) security system, a source code control system, a personnel security system, an active file repository system, a workflow management system and a collaboration system.

19. The data surveillance system of claim 18, with said first data comprising one or more of a portable document format (PDF) file, a document file, a drawing file, a presentation file, a spreadsheet file, an image file, a software code file, an intellectual property file, a text file and a binary file.

20. The data surveillance system of claim 12, wherein said at least one microprocessor is further configured to establish a context of an event in said organization based on said elements (a) through (f).

* * * * *